United States Patent
Krishna

(10) Patent No.: US 10,296,589 B2
(45) Date of Patent: May 21, 2019

(54) GROUPING CONTENT BASED UPON USER ACTIVITY

(71) Applicant: Vikas Krishna, San Jose, CA (US)

(72) Inventor: Vikas Krishna, San Jose, CA (US)

(73) Assignee: CA, Inc., New York, NY (US)

( * ) Notice: Subject to any disclaimer, the term of this patent is extended or adjusted under 35 U.S.C. 154(b) by 539 days.

(21) Appl. No.: 14/225,754

(22) Filed: Mar. 26, 2014

(65) Prior Publication Data

US 2015/0242459 A1   Aug. 27, 2015

Related U.S. Application Data

(60) Provisional application No. 61/943,829, filed on Feb. 24, 2014.

(51) Int. Cl.
*G06F 17/30* (2006.01)
*G06Q 10/10* (2012.01)

(52) U.S. Cl.
CPC ..... *G06F 17/30011* (2013.01); *G06Q 10/109* (2013.01)

(58) Field of Classification Search
CPC ........................ G06Q 10/00; G06F 17/30011
See application file for complete search history.

(56) References Cited

U.S. PATENT DOCUMENTS

| | | | | |
|---|---|---|---|---|
| 7,386,535 B1* | 6/2008 | Kalucha | ................. | G06Q 10/06 |
| 8,769,037 B2* | 7/2014 | Bostick | ............ | G06F 17/30911 |
| | | | | 709/203 |
| 2007/0055831 A1* | 3/2007 | Beeston | ................ | G06F 3/0611 |
| | | | | 711/154 |
| 2007/0143376 A1* | 6/2007 | McIntosh | ............. | G06Q 10/109 |
| 2008/0059451 A1* | 3/2008 | Musgrove | ......... | G06F 17/30864 |
| 2009/0228788 A1* | 9/2009 | Audet | ................... | G06F 17/211 |
| | | | | 715/273 |
| 2010/0070448 A1* | 3/2010 | Omoigui | ............ | H01L 27/1463 |
| | | | | 706/47 |
| 2010/0131523 A1* | 5/2010 | Yu | ........................ | G06Q 10/107 |
| | | | | 707/756 |
| 2011/0022967 A1* | 1/2011 | Vijayakumar | ....... | G06Q 10/107 |
| | | | | 715/753 |
| 2011/0231409 A1* | 9/2011 | Dhara | ................. | H04L 12/1818 |
| | | | | 707/748 |
| 2012/0323579 A1* | 12/2012 | Gibbon | ............... | G10L 15/1822 |
| | | | | 704/270 |
| 2013/0036117 A1* | 2/2013 | Fisher | ............... | G06F 17/30041 |
| | | | | 707/736 |
| 2013/0151624 A1* | 6/2013 | Bhogal | ................. | G06F 3/0484 |
| | | | | 709/205 |
| 2013/0185336 A1* | 7/2013 | Singh | ................ | G06F 17/30654 |
| | | | | 707/794 |
| 2013/0318079 A1* | 11/2013 | Kindel | .............. | G06F 17/30598 |
| | | | | 707/728 |

(Continued)

*Primary Examiner* — Jared M Bibbee
(74) *Attorney, Agent, or Firm* — Baker Botts L.L.P.

(57) ABSTRACT

A method includes identifying a meeting to be attended by a participant in the future. A context of the meeting is determined based upon meeting information included in an electronic calendar of the participant. Multiple document repositories associated with the participant are queried to identify potentially relevant documents, based upon the context. The potentially relevant documents may be compiled in a content group and the user may be provided with access to the content group.

20 Claims, 3 Drawing Sheets

(56) References Cited

U.S. PATENT DOCUMENTS

| | | | |
|---|---|---|---|
| 2014/0032567 A1* | 1/2014 | Assadollahi | G06F 17/30864 |
| | | | 707/742 |
| 2014/0237075 A1* | 8/2014 | Ida | H04L 67/322 |
| | | | 709/217 |
| 2015/0032811 A1* | 1/2015 | Kuo | H04L 67/20 |
| | | | 709/204 |

* cited by examiner

GROUPING CONTENT BASED UPON USER ACTIVITY

RELATED APPLICATIONS

This application claims the benefit under 35 U.S.C. § 119(e) of U.S. Provisional Application No. 61/943,829 filed on Feb. 24, 2014.

BACKGROUND

The disclosure relates generally to automatically compiling content for a user, and more specifically, to a system and method for grouping content based upon user activity.

SUMMARY

According to one embodiment of the disclosure, a method includes identifying a meeting to be attended by a participant in the future. A context of the meeting is determined based upon meeting information included in an electronic calendar of the participant. Multiple document repositories associated with the participant are queried to identify potentially relevant documents, based upon the context. Potentially relevant documents may be compiled in a meeting related collection and made available to the user.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
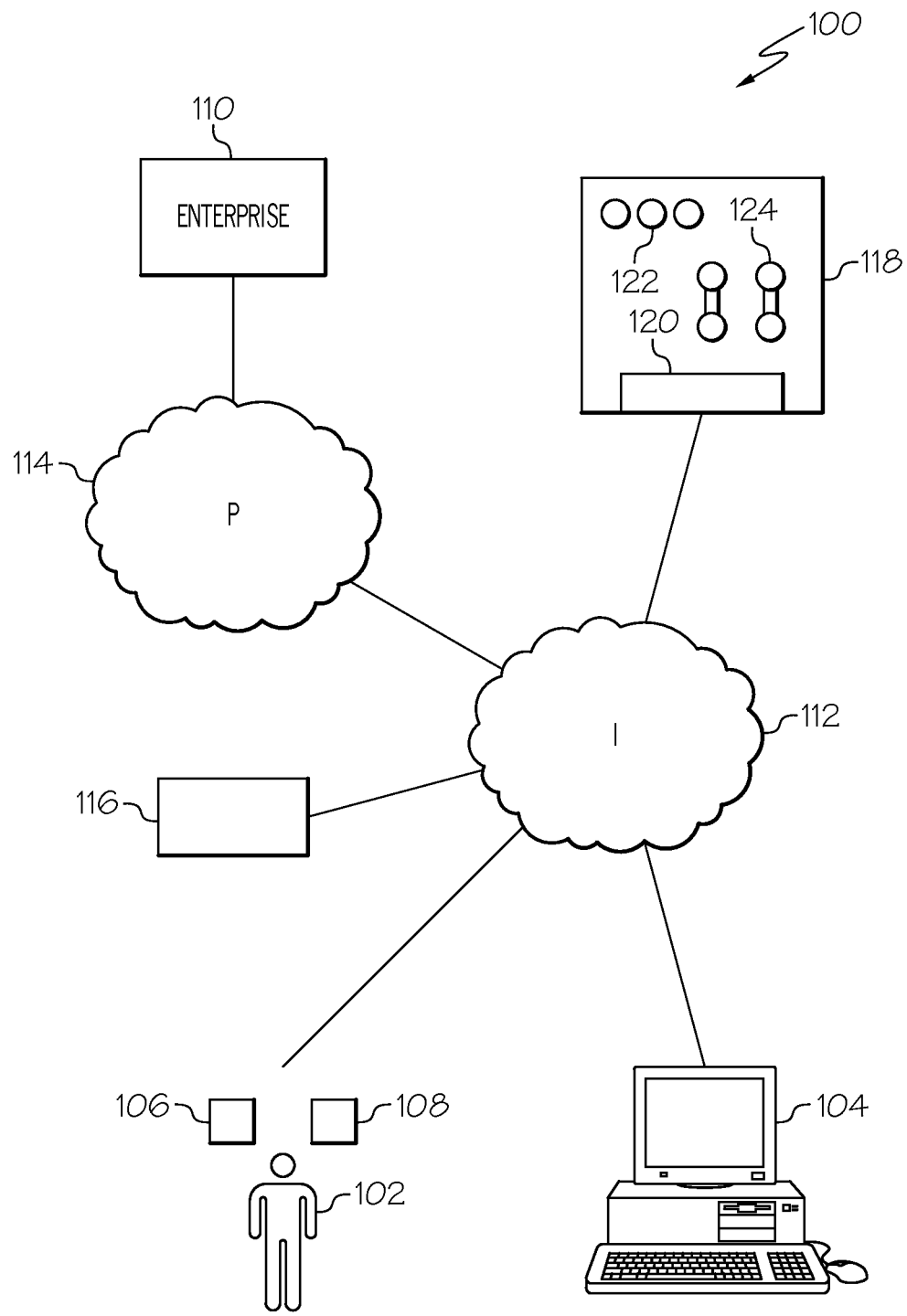
FIG. 1 illustrates a block diagram of a system for grouping content based upon user activity, in accordance with a particular embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, a network 100 that incorporates aspects of the present disclosure is illustrated. A user of network 100 has a wide variety of devices, applications, and services that are available to be leveraged. For example, user 102 will have an array of computing resources available for use. User 102 may be associated with or have access to a personal computer (PC) or other data handling system at a first location (e.g., a residence or business location). The user may also have a mobile device, such as mobile devices 106 and/or mobile device 108 with network connectivity, that allow the user to leverage the network from remote locations (e.g., a location remote to the first location of a residence or business location). Mobile devices 106 and 108 each may include a mobile telephone, smart phone, tablet PC, laptop or other personal electronic device that allows the user to communicate using network 100.

User 102 may also be associated with an enterprise 110, for example, enterprise 110 may be the employer of user 102. Thus, enterprise 110 may make network computing resources available to user 102, for example, network storage, computer processing power, and network communication bandwidth.

Network 100 may comprise any number of public, private or hybrid networks that can be accessed by user 102. For example, in the illustrated embodiment, network 100 includes a public network 112 (e.g., the Internet), and a private network 114 that is associated with enterprise 110.

Due at least in part to the number of devices, applications, and services available to user 102, a typical user will often create, compile or otherwise have access to several storage repositories that may include documents that user 102 would like to maintain access to. In addition, the typical user may also have access applications that generate and/or retain data (e.g., a social networking application that collects short text messages). For purposes of this specification, document simply refers to any compilation of stored electronic data that is viewable, or otherwise accessible, by user 102. Documents may include word processing generated documents, web pages, emails, .pdfs, database/store records, software code management or revision stores, wiki entries, stored photograph images and any other type of electronic data that a user would like to store in order to view or otherwise access in the future. In the illustrated embodiment, it is likely that user 102 has documents stored on the user's PC 104, mobile devices 106 and 108, and various resources made available by enterprise 110 (servers, computers and other network resources). Enterprise 110 may offer user 102 certain resources shared with other employees of the enterprise (e.g., SharePoint) and/or may offer user 102 its own private resources. In the described embodiment, user 102 also has access to many publicly available resources where documents may be stored, for example the Internet (e.g., World Wide Web, FTP sites, non-HTML web pages, etc.), and other devices and services 116 made available by a third party "in the cloud." Documents available in the cloud may include documents available by third party providers including Gmail or Google Documents/Drive, Microsoft Office 365, Box, Microsoft SkyDrive and Dropbox where user 102 may generate and/or store documents. Documents available to be associated with user 102 in the Internet are practically limitless.

User 102 is also likely to maintain at least one, and probably more than one electronic calendar or scheduling device that allows the user to effectively manage the user's time. The calendar may be made available to the user from the employer/enterprise, for example Microsoft Outlook with email and calendar functionality. The calendar may be locally resident on one or more devices available to the user, for example PC 104, mobile devices 106 and 108, or other scheduling devices, applications or services available in the cloud (e.g., Google Calendar).

In the illustrated embodiment of FIG. 1, a mobile content management server 118 allows user 102 to consolidating access to all of the content (documents) of repositories associated with each of the above references resources to be consolidated and managed in a single location. Mobile content management server 118 may be any combination of computer hardware, software and resources that allow for network connectivity, processing, and memory storage. In the illustrated embodiment, mobile content management server 118 includes an interface 120, processors 122 and memory (repositories) 124. Interface 120 may be a physical device and/or software construct. An example mobile content management platform is one made available by CA Technologies (see www.ca.com). In accordance with particular aspects of the present disclosure, mobile content management server 118 can be used to automatically compile, store and make available to the user, a compilation of documents (e.g., file, folder, Content Group) that may be useful to user 102 in a certain situation, for example a scheduled meeting.

Today, typical employees are pressed for time and scramble to get everyday tasks done. They often walk into meetings, with mobile devices like tablets and smartphones, on a moment's notice or without adequate preparation despite prior notice, due to the extensive workload a knowledge worker typically carries. When a slice of time is available to prepare for an upcoming meeting or event, employees tend to fish and/or search for information pertinent to the meeting and review that to be better equipped for the upcoming discussion. They also often create folders, virtual folders, or in CA Mobile Content Management (MCM) parlance—Content Groups, to collect documents relevant to the upcoming event for quick access prior to, or at the event. For purposes of this specification, Content Group shall refer to any storage compilation including files, folders, virtual folders or other mechanisms to compile electronic documents. The process described above tends to be laborious as well as error-prone and often incomplete due to lack of time, costing workers valuable time being wasted in preparation for a meeting or due to the resulting inefficient meetings.

The teachings of the present disclosure allow a user to more effectively use and manage time, by automatically identifying a meeting, determining what documents available to the user 102 may be useful for such meeting, and automatically compiling those documents in a folder or Content Group to be made available to the user. In particular, to enable users (e.g., mobile knowledge workers) with the needed information at the time of a meeting, the teachings of this disclosure enable the understanding of a user's upcoming events, their content corpus (all repositories and documents associated with the user), and their past interactions with those they plan to meet (other participants) either in person or virtually (video- or tele-conference). It then enables the automatic creation of collections of content sufficiently in advance of the meeting (e.g., to allow review and utilization of the content), to better facilitate value-producing interactions on their mobile devices, as workers move about to collaborate with others. In particular embodiments, this can result in a ranked list of content pertinent to an upcoming event.

Figure 2A:
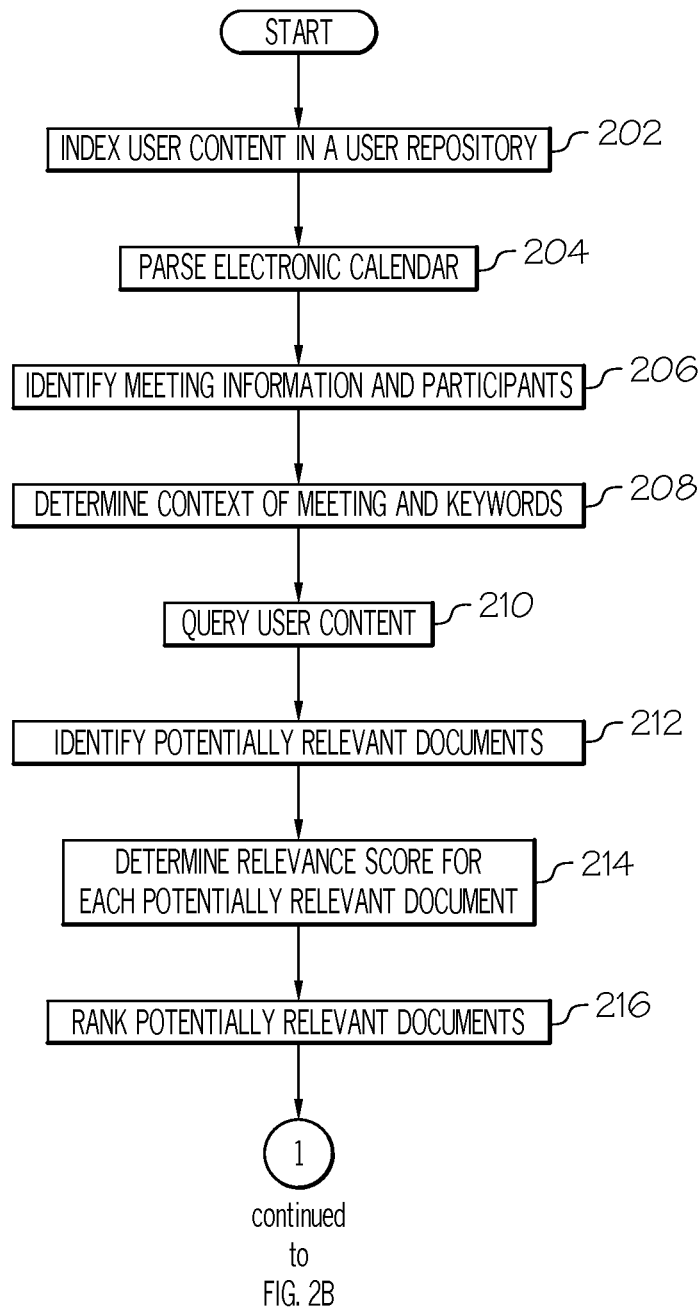
FIGS. 2A and 2B illustrate a flow chart of a method for grouping content based upon user activity, in accordance with a particular embodiment of the present disclosure.
Figure 2B:
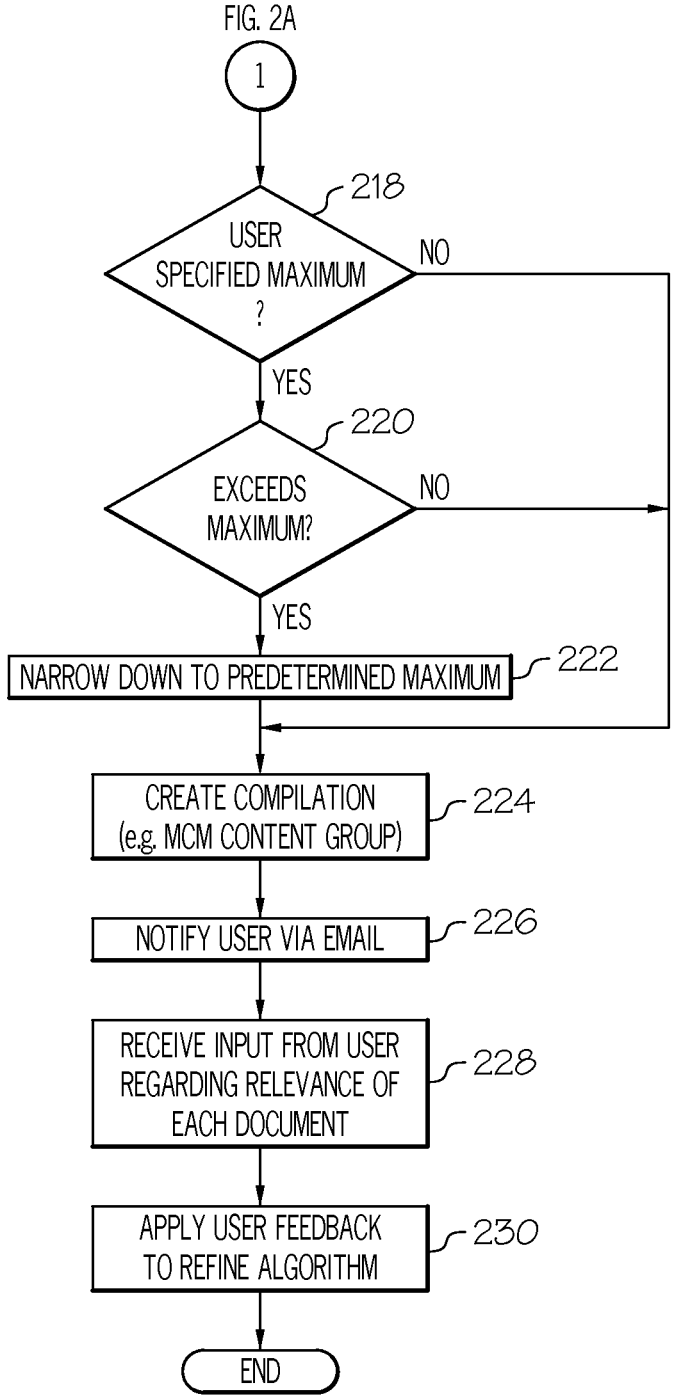

FIGS. 2A and 2B illustrate a method for grouping content based upon a user's activity, in accordance with a particular embodiment of the present disclosure. The method begins at step 202 where user content in a plurality of repositories associated with the user is retrieved and indexed. The indexing can apply to all documents that are stored on devices and repositories accessible to the user, whether remote or local. Indexing provides a single point of audit for all documents created by, stored by, or otherwise indicated as pertinent by the user. In a particular embodiment, the indexing may be accomplished for all of a user's content, and stored in a central system such as a mobile content management server (e.g., 118).

At step 204, the electronic calendar(s) of the user are parsed in order to determine information about upcoming meetings. For example, the system may be able to identify all meetings that are scheduled to occur over some pre-defined period of time in the future (e.g., the next day, week, or month). It is possible that the user will have more than one electronic calendar, and the teachings of this disclosure envision that each calendar may be parsed.

Next, at step 206, meeting information including participants and their roles are identified. For example, meeting information may include information on whether the participant is a meeting coordinator or a meeting participant, and may further indicate whether the participant is an engineer, architect, project lead, or other suitable designation. Meeting information may include various information that is generally made available in electronic calendars, including the subject of the meeting (e.g., title, or "subject line", start time, end time, date, location, dial-in information (for conference call or videoconference), meeting organizer, participants, RSVPs for each participant (if applicable, e.g., accepted or declined), resources available, resources necessary, and recurrence (if part of a series of related meetings). The calendar may also include attached documents, or hyperlinks to other networks resources. The calendar may also include an agenda for the meeting, meeting minutes from a prior meeting(s) or other documents or embedded information that would be helpful to establish the purpose, topic or subject of the meeting (collectively, the meeting "context").

At step 208, the context of the meeting and keywords are determined. The context of the meeting may be ascertained by mobile content management server 118 using any and all information available from the electronic calendar of the user (including the information discussed above), and any other documents associated with the user (e.g., stored on mobile device, PC, enterprise accounts, etc.). For example, the context of the meeting may be determined by understanding the "subject" identified in the electronic calendar. The context may also be understood by reviewing the participants, and ascertaining the relationship between the participants and the user. Knowing who the participants are and how they are related to the user will often lead to an understanding of the subjects likely to be discussed. Moreover, a review of prior meetings, agendas or meeting minutes during which the same participants were present may be helpful to understand the context. If the meeting is one of a recurring meeting series, understanding the results from prior meetings (e.g., meeting minutes) or other notes from the prior meeting (e.g., notes taken by the user at prior meetings) can help ascertain context.

At step 210, content associated with the user can be queried, using the context of the meeting as determined at step 208, and/or using key words that were derived from the context or from any of the information that was used to determine the context. Particularly since the mobile content management server may have already indexed all of the documents associated with the user, the query can be applied against that entire index. The result of the query will result in the identification of a plurality of potentially relevant documents at step 212. Potentially relevant documents could include any documents that the user may want to have quick access to during the meeting. In addition to documents stored in repositories associated with the user, the mobile content management server may also query publicly available information or documents (e.g., available on the Internet) and documents available through the enterprise but not necessarily associated with user 102. For example, if mobile content management server 118 determines that a meeting will occur in the future to discuss the product development of product xyz and that an employee of a third party "development partner" will attend the meeting, then a resume or profile of the third party employee (e.g., LinkedIn profile) may be obtained from the World Wide Web, and the latest version of the Feature Requirements Specification may be obtained from a server of enterprise 110. These documents may be relevant and helpful to user 102 to prepare for or participate in the meeting, but they may not have already been available in repositories associated with user 102.

Next, at step 214, a relevance score is calculated and applied to each of the potentially relevant documents. The relevance score is a measure of how well a particular document is related to the context of the meeting or keywords associated with the meeting, and/or how likely it is that the user may want to access the document while at the meeting. The relevance scores determined at step 214 allow for the potentially relevant documents to be ranked at step 216, in order of relevance.

In order to limit the number of potentially relevant documents that are compiled in accordance with this method, a user is given the opportunity to specify a maximum number of documents to be identified and compiled. For example, a user may specify ahead of time that no more than 12 (or 15, or 25) documents should be collected for any given meeting. This avoids overload for the user and keeps the number of documents to a level that is usable during the meeting. It also saves storage space, since large compilations of documents can use a lot of memory. In addition, to limit the number of potentially relevant documents, the amount of time a user has to access the content compilation, or the amount of time the user has accessed the content compilation, prior to the meeting may be used to adjust the amount of content provided. For example, for a user that only has 5-10 minutes to review documents before a meeting begins, the system may modify the number of documents, how the documents are presented to the user, and/or how the documents are prioritized, based on the user's limited time for review. Further, the system may also generate a "digest" of the documents for an "executive summary" type view. Moreover, the system may change the content priority to dynamically match the agenda. For example, if the agenda includes topics 1, 2, and 3, the system may prioritize the documents related to each topic or multiple topics based on the discussion flow of the topics. In addition, for example, if a user arrives late to a meeting and the discussion has progressed to a certain topic (e.g., topic 2 of 3), the system can prioritize the documents based on the "topic" location within the meeting after determining this location (e.g., by using transcription/speech to text recognition, or any other suitable techniques).

Thus, at step 218, the system determines whether the user specified a predetermined maximum number of documents. If so, then to the extent that the total number of potentially relevant documents is higher than the predetermined maximum at step 220, the compilation of documents is narrowed down to the predetermined maximum at step 222, using the relevance scores.

Next, as step 224, a compilation of documents is assembled and stored as a group. The compilation may be stored together in a folder, or Content Group, for ease of access to the user. Some or all of the keywords related to the Content Group may be used in the name of the Content Group to help the user easily understand the contents of the Content Group. Moreover, in accordance with a particular embodiment, the Content Group may be tagged as having been automatically created by the mobile content management server, so the user can easily identify automatically generated Content Groups in the future, and distinguish such content groups from content groups that were manually created by the user.

Thereafter, the user is notified via email that the Content Group has been created (step 226). The email may include a hyperlink to the Content Group to allow the user ease of access. The Content Group may also be stored in the electronic calendar to allow the user to access the Content Group from within the calendar entry. Similarly, a hyperlink could be used within the calendar entry to allow the user ease of access to the Content Group.

The mobile content management server may also provide the user with the ability to tag or otherwise comment on the documents within the Content Group to determine whether the documents are relevant or not relevant, for example at step 228. In some embodiments, the user may have the ability to score the document on a scale (e.g., 1 to 10) to determine a relative relevance of each document. The input from the user can be used to determine the performance of the mobile content management server in preparing the Content Group. The input from the user may also be used to determine feedback to be used to refine an algorithm, at step 230.

Those of ordinary skill in the art will appreciate that the examples mentioned above are merely for illustrative purposes. Any other use of otherwise private information may be obtained from service providers and used to identify a user without departing from the scope of the present disclosure.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   identifying a meeting to be attended by a participant in the future, wherein multiple document repositories are associated with the participant;
   retrieving and indexing the participant's content in the multiple document repositories, wherein the participant's indexed content is stored in a central system;
   determining, using a processor, a context of the meeting based upon meeting information included in an electronic calendar of the participant, wherein the meeting information comprises an agenda;
   querying the multiple document repositories associated with the participant using the context and key terms associated with the context, wherein querying comprises applying the context and key terms against the participant's indexed content;
   identifying a plurality of potentially relevant documents based upon the query results;
   compiling the identified potentially relevant documents and storing the documents as a group in a meeting documents collection;
   providing the participant with access to the meeting documents collection, wherein the providing the participant with access comprises sending a hyperlink to the participant to allow ease of access to the meeting documents collection; and dynamically changing priority of contents of the meeting documents collection to match the agenda.

2. The method of claim 1, wherein identifying a meeting to be attended by a participant in the future comprises parsing the electronic calendar of the participant to determine a date, a time and the context of the meeting.

3. The method of claim 1, further comprising indexing all content of the multiple document repositories associated with the participant and wherein querying the multiple document repositories comprises posing individual queries against the indexed content.

4. The method of claim 1, further comprising determining a plurality of key terms based upon the context, and using the plurality of key terms in querying the multiple document repositories.

5. The method of claim 1, further comprising:
determining, for each of the potentially relevant documents, a respective relevance score; and
sorting, in descending order, each of the potentially relevant documents in the meeting documents collection, according to the respective relevance score.

6. The method of claim 5, further comprising:
using a search algorithm in querying the multiple document repositories receiving feedback from the participant regarding the relevance of each of the potentially relevant documents; and
using the feedback to refine the search algorithm.

7. The method of claim 4, further comprising:
embedding the plurality of key terms in a name of the meeting documents collection; and
tagging the content group as having been automatically generated.

8. The method of claim 1, further comprising:
determining, for each of the potentially relevant documents, a respective relevance score;
receiving, from the participant, an indication of a maximum number of documents to be included in the content group;
using the respective relevance scores to limit the number of potentially relevant documents included in the content group, to the maximum number.

9. The method of claim 1, further comprising sending an email to the participant with a subject line related to a subject of the meeting, notifying the participant that the content group is available to the participant.

10. A computer configured to access a storage device, the computer comprising:
a processor; and
a non-transitory, computer-readable storage medium storing computer-readable instructions that when executed by the processor cause the computer to perform:
identifying a meeting to be attended by a participant in the future, wherein multiple document repositories are associated with the participant;
retrieving and indexing the participant's content in the multiple document repositories, wherein the participant's indexed content is stored in a central system;
determining a context of the meeting based upon meeting information included in an electronic calendar of the participant;
querying the multiple document repositories associated with the participant using the context and key terms associated with the context, wherein querying comprises applying the context and key terms against the participant's indexed content;
identifying a plurality of potentially relevant documents based upon the query results;
compiling the potentially relevant documents in a content group;
generating a digest of the potentially relevant documents;
storing the content group in the electronic calendar of the participant; and
providing the participant with access to the content group.

11. The computer of claim 10, wherein identifying a meeting to be attended by a participant in the future comprises parsing the electronic calendar of the participant to determine a date, a time and the context of the meeting.

12. The computer of claim 10, wherein the computer-readable instructions further cause the computer to perform indexing all content of the multiple document repositories associated with the participant and wherein querying the multiple document repositories comprises posing individual queries against the indexed content.

13. The computer of claim 10, wherein the computer-readable instructions further cause the computer to perform determining a plurality of key terms based upon the context, and using the plurality of key terms in querying the multiple document repositories.

14. The computer of claim 10, wherein the computer-readable instructions further cause the computer to perform:
determining, for each of the potentially relevant documents, a respective relevance score; and
arranging each of the potentially relevant documents in the content group, according to the respective relevance score.

15. The computer of claim 14, wherein the computer-readable instructions further cause the computer to perform:
using a search algorithm in querying the multiple document repositories;
receiving feedback from the participant regarding the relevance of each of the potentially relevant documents; and
using the feedback to refine the search algorithm.

16. The computer of claim 10, wherein the computer-readable instructions further cause the computer to perform:
determining, for each of the potentially relevant documents, a respective relevance score;
receiving, from the participant, an indication of a maximum number of documents to be included in the content group; and
using the respective relevance scores to limit the number of potentially relevant documents included in the content group, to the maximum number.

17. A computer program product, comprising:
a computer-readable storage medium having computer-readable program code embodied therewith, the computer-readable program code comprising:
computer-readable program code configured to identify a meeting to be attended by a participant in the future, wherein multiple document repositories are associated with the participant;
computer-readable program code configured to determine a context of the meeting based upon meeting information included in an electronic calendar of the participant wherein the meeting information comprises an agenda;
computer-readable program code configured to query the multiple document repositories associated with the participant using the context and key terms associated with the context, wherein querying comprises applying the context and key terms against the participant's indexed content;

computer-readable code configured to identify a plurality of potentially relevant documents based upon the query results;

computer-readable program code configured to compile the potentially relevant documents in a content group;

computer-readable program code configured to store the content group;

computer-readable program code configured to provide the participant with access to the content group; and computer-readable program code configured to dynamically change priority of the potentially relevant documents in the content group to match the agenda.

18. The computer program product of claim 17, wherein identifying a meeting to be attended by a participant in the future comprises parsing the electronic calendar of the participant to determine a date, a time and the context of the meeting.

19. The computer program product of claim 17, further comprising:

computer-readable program code configured to determine, for each of the potentially relevant documents, a respective relevance score; and computer-readable program code configured to arrange each of the potentially relevant documents in the content group, according to the respective relevance score.

20. The computer program product of claim 19, further comprising:

computer-readable program code configured to determine, for each of the potentially relevant documents, a respective relevance score;

computer-readable program code configured to arrange each of the potentially relevant documents in the content group, according to the respective relevance score;

computer-readable program code configured to use a search algorithm in querying the multiple document repositories;

computer-readable program code configured to receive feedback from the participant regarding the relevance of each of the potentially relevant documents; and computer-readable program code configured to use the feedback to refine the search algorithm.

* * * * *